(12) United States Patent
Li et al.

(10) Patent No.: US 10,021,708 B2
(45) Date of Patent: Jul. 10, 2018

(54) DEVICE AND METHOD FOR LINK ADAPTATION IN A WIRELESS NETWORK

(71) Applicant: Telefonaktiebolaget LM Ericsson (publ), Stockholm (SE)

(72) Inventors: Gen Li, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/548,342

(22) PCT Filed: Apr. 25, 2016

(86) PCT No.: PCT/CN2016/080129
§ 371 (c)(1),
(2) Date: Aug. 2, 2017

(87) PCT Pub. No.: WO2017/185205
PCT Pub. Date: Nov. 2, 2017

(65) Prior Publication Data
US 2018/0124799 A1    May 3, 2018

(51) Int. Cl.
    H04W 72/00   (2009.01)
    H04W 72/08   (2009.01)
    H04W 28/02   (2009.01)
    H04W 72/12   (2009.01)
    H04W 16/14   (2009.01)

(52) U.S. Cl.
    CPC ..... *H04W 72/085* (2013.01); *H04W 28/0236* (2013.01); *H04W 72/082* (2013.01); *H04W 72/1215* (2013.01); *H04W 16/14* (2013.01)

(58) Field of Classification Search
    CPC .................................................. H04W 72/085

USPC ..................................................... 455/452.2
See application file for complete search history.

(56) References Cited

U.S. PATENT DOCUMENTS

| 8,755,340 B2 | 6/2014 | Anderson et al. |
| 2014/0198656 A1* | 7/2014 | Venkatesh ............ H04L 47/125 370/235 |

FOREIGN PATENT DOCUMENTS

| CN | 102014505 A | 4/2011 |
| CN | 102665270 A | 9/2012 |
| CN | 103299703 A | 9/2013 |
| WO | 2014205644 A1 | 12/2014 |

OTHER PUBLICATIONS

International Search Report and Written Opinion for International Patent Application No. PCT/CN2016/080129, dated Feb. 6, 2017, 11 pages.

* cited by examiner

*Primary Examiner* — Joel Ajayi
(74) *Attorney, Agent, or Firm* — Withrow & Terranova, PLLC (57) ABSTRACT

The disclosure provides a method in a wireless network for link adaptation. The method comprises transmitting a first grant message indicating grant resources for a first link path to a first user equipment, UE; monitoring the grant resources for the first link path to determine whether data is transmitted from the first UE on the first link path; and inhibiting link adaptation for the grant resources for the first link path if no data is transmitted from the first UE on the first link path. The disclosure also provides a network node and a user equipment for link adaptation.

10 Claims, 5 Drawing Sheets

DEVICE AND METHOD FOR LINK ADAPTATION IN A WIRELESS NETWORK

This application is a 35 U.S.C. § 371 national phase filing of International Application No. PCT/CN2016/080129, filed Apr. 25, 2016, the disclosure of which is incorporated herein by reference in its entirety.

TECHNICAL FIELD

The disclosure relates generally to wireless communications, and more particularly, to a device and a method for link adaptation in a wireless network.

BACKGROUND

Nowadays, massive growth in mobile broadband data traffic drives the evolution of the cellular systems to meet the tremendous need for increased capacity. However, the traffic growth will be difficult to address with spectrum currently available for cellular systems, especially for the valuable bands with low propagation loss below 6 GHz. The licensed band is superior, from the quality and availability perspective, but scarce and expensive, especially below 6 GHz. Given the fact that the current amount of unlicensed spectrum is comparable to the amount of licensed spectrum, and the fact that in some regions, more unlicensed spectrum is planned to be allocated, it is natural for operators to look into the potential of utilizing unlicensed spectrum to meet the traffic growth demands.

In 3GPP, studies on supporting LTE in unlicensed spectrum are likely to take place, focusing on low-power nodes. The basic set-up is "licensed-assisted access" (LAA) with carrier aggregation (CA) between licensed and unlicensed carriers. A licensed LTE carrier is used for all mobility, control signaling and parts of the user data, while one or more carriers in unlicensed spectrum are used to boost the user-data performance. For release 13, DL data transmission in unlicensed band is supported and UL is also discussed. When coming to release 14, UL data transmission in unlicensed band will be supported as well. Besides, unlicensed operation is important for NX systems as well, especially standalone deployment with both DL and UL to support enterprise solutions.

The idea of outer loop link adaptation (OLLA) is that estimated CQI is adjusted from reported CQI according to HARQ feedback due to that the estimated CQI may be outdated or inaccurate. In particular, outer-loop CQI adjustment based on block error rate (BLER) is employed to compensate the difference between SINR indicated by CQI and actual SINR. The basic idea is that whenever a NACK is received, the estimated SINR will be reduced by a pre-defined value (delta1), while after a few of continuous ACKs (M) being received, the estimated SINR will be increased by another predefined value (delta2). The value M and delta1 and delta2 depend on the targeted BLER. In fact, there are many versions of OLLA algorithms for a better or different performance.

In cellular systems operation in unlicensed band, there are two steps for accomplishing UL data transmission. First, UL grant transmission from BS allows a UE to know at which resource it should transmit data. Second, the UE transmits UL data in the granted resource. Note that the same UL resource could be allocated to one or more UEs as a possible better efficiency when with listen-before-talk (LBT) mechanism.

Figure 1:
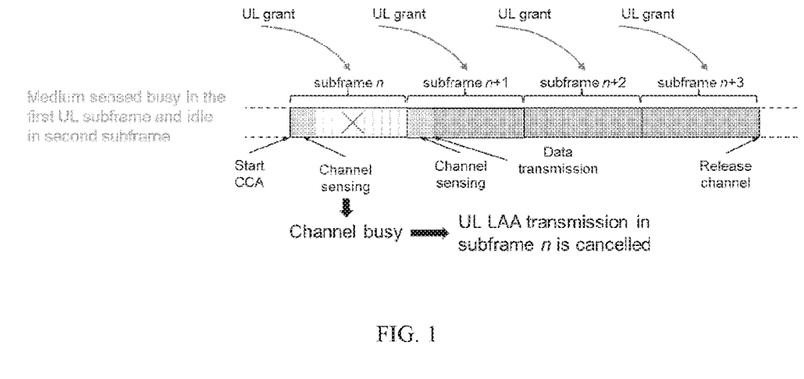
FIG. 1 is a schematic diagram showing an example where the channel clearance assessment (CCA) period (Green part) is used for UE to perform LBT.

For the second step for UL data transmission, listen-before-talk is needed at UE side to avoid collision. In other words, UL transmission is subject to listen-before-talk success. FIG. 1 shows an example where the channel clearance assessment (CCA) period (Green part) is used for UE to perform LBT. When channel is being sensed busy in the first UL granted sub-frame, UL data transmission is canceled. Then if a channel is idle in the second sub-frame, UL data is transmitted from UE side. In other words, the UL data transmission may not happen even when UL grant is received at UE side.

Figure 2:
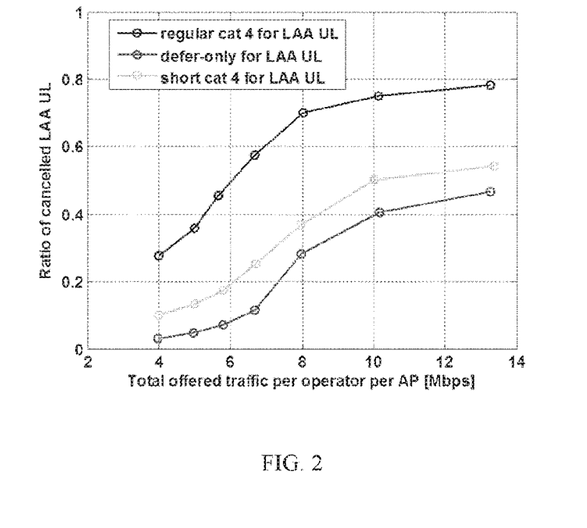
FIG. 2 is a schematic diagram showing an example of evaluation result for LAA-LTE and Wi-Fi coexistence.

FIG. 2 shows an example of evaluation result for LAA-LTE and Wi-Fi coexistence. As shown in FIG. 2, the ratio of cancelled LAA UL is possibly large especially when the offered traffic is high. It means there is a large probability that no UL data transmission occurs even after an UL grant is sent from BS side.

Figure 3:
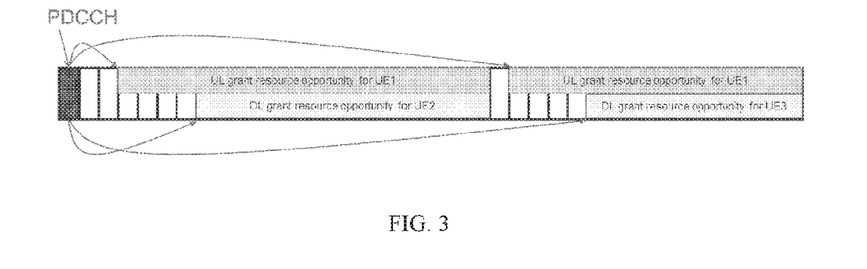
FIG. 3 is a schematic diagram showing an example scenario in which one DL grant is issued for a possible DL Transmission at a time duration shortly after the UL grant resource opportunity.

FIG. 3 shows an example scenario in which one DL grant may be issued for a possible DL Transmission at a time duration shortly after the UL grant resource opportunity. In the operation as shown in FIG. 3, an eNB may firstly detect and decode in the first several symbols of granted sub-frame(s). If CRC identifies an ongoing UL data, the eNB proceeds to receive the rest of the UL data transmission; otherwise, the eNB starts DL LBT procedure to initiate a DL transmission specified by the DL grant.

However, data transmission in the UL grant resource has a high probability that it cannot be transmitted due to the LBT requirement which results in problems for a regular link adaptation. In particular.

For UL data transmission in UL grant resource as described above. UE performs listen before talk (LBT) at the beginning of UL grant resource and the data cannot be transmitted if channel clearance and random back-off procedure has not been completed before the granted time duration starts.

For DL data transmission in overlapping UL grant and DL grant as described above, the data cannot be transmitted: (1) if the eNB identifies an UL data TRANSMISSION is ongoing; or (2) if the eNB performs LBT and cannot complete the channel clearance detection and backoff procedure before granted opportunity starts.

When the data is not transmitted in the grant resource, the target receiver can't decode data and misunderstand that the channel becomes worse so that the data is lost. According to OLLA algorithm, the eNB will decrease MCS level for DL or UL transmission. Since the MCS decreasing is always more responsive to a TRANSMISSION failure than its increasing step to a TRANSMISSION success and the 'no transmission' situation become more often in aforementioned unlicensed spectrum cases, the selected MCS would be always in a low level even when the channel status is good. Thus, the spectrum efficiency is low.

SUMMARY

To solve the aforesaid problems, improved link adaptation schemes are provided for data transmission in grant resource. The key concept is to adjust the link adaptation by differentiating whether incorrect decoding of data is caused by no transmission or bad channel status.

In a first aspect of the disclosure, a method in a wireless network for link adaptation is provided. The method comprises transmitting a first grant message indicating grant resources for a first link path to a first user equipment, UE. The method further comprises monitoring the grant resources for the first link path to determine whether data is transmitted from the first UE on the first link path. If no data is transmitted from the first UE on the first link path, link adaptation is inhibited for the grant resources for the first link path. Thus, unnecessary link adaptation is avoided and spectrum efficiency can be improved.

In an embodiment, received energy in the grant resources for the first link path is aggregated and compared with a threshold. If the aggregated energy is above the threshold, it is determined that data is transmitted from the first UE on the first link path. The threshold may be, for example, UE-specific, cell-specific, or fixed.

In an alternative, a signature sequence is searched in the grant resources for the first link path. If the signature sequence is found in the grant resources for the first link path, it is determined that data is transmitted from the first UE on the first link path.

In an embodiment, the method further comprises transmitting a second grant message allowing data transmission in the grant resources for the first link path to a second UE. The second grant message informs the second UE of a possibility of non-transmission at the grant for a second link path. The grant resources for the first link path are monitored to determine whether data is transmitted to the second UE on the second link path. If no data is transmitted to the second UE on the second link path, an ACK/NACK message received from the second UE is overridden. The second UE is then indicated that new data will be transmitted at the next possible grant for the second link path.

In a second aspect of the disclosure, a method in a wireless network for link adaptation is provided. The method comprises receiving a second grant message allowing data transmission on a second link path in grant resources for a first link path from a network node. The grant resources for the first link path are monitored to determine whether data is transmitted on the second link path. If data is transmitted on the second link path in the grant resources for the first link path, an ACK/NACK message is transmitted to the network node; otherwise, no ACK/NACK message will be sent to the network node.

In an embodiment, it is determined whether the signal strength or signal-to-interference-plus-noise-ratio, SINR, within physical resource blocks, PRBs, specified at the grant for the second link path is above a threshold.

In a third aspect of the disclosure, a network node in a wireless network for link adaptation is provided. The network node comprises a transmitting unit configured to transmit a first grant message indicating grant resources for a first link path to a first user equipment, UE. The network node further comprises a monitoring unit configured to monitor the grant resources for the first link path to determine whether data is transmitted from the first UE on the first link path. The network node further comprises a processing unit configured to inhibit link adaptation for the grant resources for the first link path if no data is transmitted from the first UE on the first link path.

In an embodiment, the monitoring unit aggregates received energy in the grant resources for the first link path, compares the aggregated energy with a threshold, and determines that data is transmitted from the first UE on the first link path if the aggregated energy is above the threshold. The threshold may be, for example, UE-specific, cell-specific, or fixed.

In an alternative, the monitoring unit searches a signature sequence in the grant resources for the first link path. If the signature sequence is found in the grant resources for the first link path, the monitoring unit determines that data is transmitted from the first UE on the first link path.

In an embodiment, the transmitting unit transmits a second grant message allowing data transmission on a second link path in the grant resources for the first link path to a second UE, the second grant message informing the second UE of a possibility of non-transmission at the grant for a second link path. The monitoring unit monitors the grant resources for the first link path to determine whether data is transmitted to the second UE on the second link path. The processing unit overrides an ACK/NACK message received from the second UE if no data is transmitted to the second UE on the second link path, and indicates to the second UE that new data will be transmitted at the next possible grant for the second link path.

In a fourth aspect of the disclosure, a user equipment is provided. The user equipment comprises a receiving unit configured to receive a second grant message allowing data transmission on a second link path in grant resources for a first link path from a network node. The user equipment further comprises a monitoring unit configured to monitor the grant resources for the first link path to determine whether data is transmitted on the second link path. The user equipment further comprises a transmitting unit configured to transmit an ACK/NACK message to the network node if data is transmitted on the second link path in the grant resources for the first link path, and not to transmit ACK/NACK message to the network node if no data is transmitted on the second link path in the grant resources for the first link path.

In an embodiment, the monitoring unit determines whether the signal strength or signal-to-interference-plus-noise-ratio, SINR, within physical resource blocks, PRBs, specified at the grant for the second link path is above a threshold.

In a fifth aspect of the disclosure, a network node is provided which comprises a processor and a memory. The memory contains instructions executable by the processor whereby the network node is operative to perform the method in accordance with the first aspect of the disclosure.

In a sixth aspect of the disclosure, a user equipment is provided which comprises a processor and a memory. The memory contains instructions executable by the processor whereby the user equipment is operative to perform the method in accordance with the second aspect of the disclosure.

In a seventh aspect of the disclosure, a computer program comprising computer program code means is provided. The computer program code means cause, when executed by at least one processor, the at least one processor to perform the method in accordance with the first or second aspect of the disclosure.

In an eighth aspect of the disclosure, a computer readable medium is provided. The computer readable medium has stored thereon the computer program in accordance with the seventh aspect of the disclosure.

With the embodiments of the disclosure, it is possible to determine whether incorrect decoding of data is caused by no data transmission or bad channel status. Accordingly, unnecessary link adaptation is avoided and spectrum efficiency can be improved.

BRIEF DESCRIPTION OF THE DRAWINGS

The above and other objects, features and advantages will be more apparent from the following description of embodiments with reference to the figures, in which.

DETAILED DESCRIPTION

In the discussion that follows, specific details of particular embodiments of the present disclosure are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or several nodes.

As used herein, the term "user equipment" refers to any device that can access a wireless communication network and receive services therefrom. By way of example and not limitation, a user equipment (UE) may include, but is not limited to, a mobile phone, a cellular phone, a smart phone, a tablet, a wearable device, a personal digital assistant (PDA), and the like.

The term "network node" used herein refers to a device at the network side and may include a network device via which a terminal device accesses the network and receives services therefrom. By way of example, such a network node may be a base station (BS), a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Improved link adaptation schemes are proposed herein for data transmission in grant resources. The key idea is to adjust the link adaptation by determining whether incorrect decoding of data is caused by no data transmission or fading channel status. In the following exemplary embodiments, the improved link adaptation schemes will be described in the context of uplink and downlink data transmissions in a wireless network. It should be noted, however, that various modifications or alternations can be made and the scope of the disclosure is not limited thereto.

For example, as to UL data transmission, an eNB may determine whether a configured UE really transmits UL data. If not, the eNB would not make CQI adjustment for outer loop link adaptation. For DL data transmission, there are two options: (1) a new type of DL grant indicating the possibility of non-transmission at DL for UE's awareness may be defined so that UE could detect whether TRANSMISSION is carred out or not by examining when the signal strength at the PRBs specified at DL grant is above a preset threshold or not, or its SINR above the a pre-set threshold or not; once it is determined that no DL TRANSMISSION happens as the grant indicated, the UE would suppress its ACKINCK TRANSMISSION to avoid OLLA adjustment; (2) the eNB may override the ACKINCK received from the UE for link adaptation adjustment and indicate "new data" to UE at the next possible DL TRANSMISSION to avoid HARQ chase-combining kind of operation at UE.

Figure 4A:
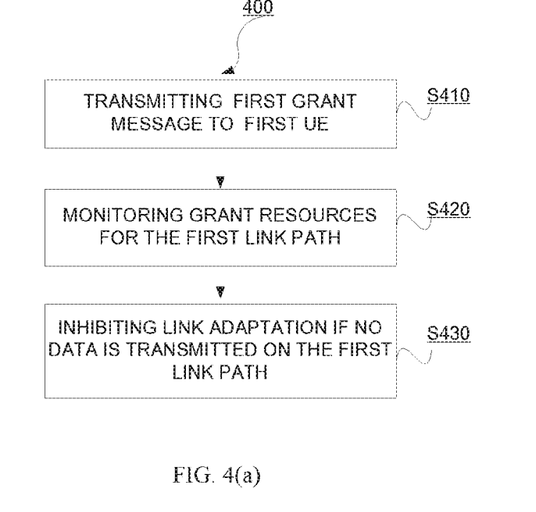
FIG. 4(a) is a flowchart illustrating a method in a wireless network for link adaptation according to an embodiment of the disclosure.

FIG. 4(a) is a flowchart illustrating a method 400 in a wireless network for link adaptation according to an embodiment of the disclosure. The method 400 may be performed at a network node in a wireless network, such as an eNB. The method 400 as shown in FIG. 4(a) includes the following steps.

At step S410, a first grant message indicating grant resources for a first link path is transmitted to a first user equipment, UE. For example, the first link path may be an uplink (UL) path and the first grant message may be an UL grant message indicating grant resources for the UL path.

Figure 4B:
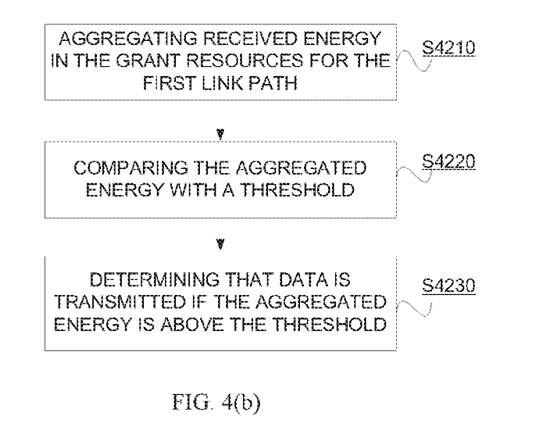
FIG. 4(b) is a flowchart illustrating an example procedure for monitoring the grant resources for the first link path according to an embodiment of the disclosure.

At step S420, the grant resources for the first link path are monitored to determine whether data is transmitted from the first UE on the first link path. FIG. 4(b) is a flowchart illustrating an example procedure for monitoring the grant resources for the first link path. As shown in FIG. 4(b), received energy is aggregated in the grant resources for the first link path at step S4210. Then, the aggregated energy is compared with a threshold at step S4220. If the aggregated energy is above the threshold, it is determined that data is transmitted from the first UE on the first link path, at step S4230.

In this example, the threshold may be UE-specific and time variant adaptive to different situations. The eNB may determine the threshold for each UE according to the reporting RSRP. Generally, lower RSRP means that the UE is far from the eNB and the threshold should be set smaller.

Alternatively, the threshold may be cell-specific. In this case, the threshold may be trained at eNB side for multiple samples. The eNB make measurement for selected resource samples with and without transmission respectively in the cell. Two values may be obtained by averaging the received energy and then the threshold may be selected based upon these two values, e.g. a mean value of the two values. In addition, the measurement may be trained periodically and adaptively changed. Alternatively, the threshold may be fixed from a long term training.

Figure 4C:
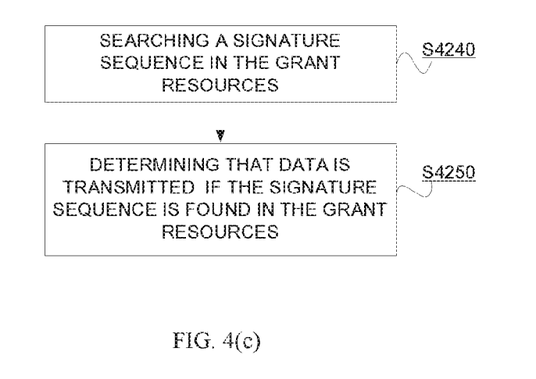
FIG. 4(c) is a flowchart illustrating an example procedure for monitoring the grant resources for the first link path according to another embodiment of the disclosure.

FIG. 4(c) is a flowchart illustrating another example procedure for monitoring the grant resources for the first link path. As shown in FIG. 4(c), a signature sequence is searched in the grant resources for the first link path at step S4240. If the signature sequence is found in the grant resources for the first link path, it is determined that data is transmitted from the first UE on the first link path, at step S4250.

In this example, a signature sequence may be added at the head of each data transmission on the first link path. For example, a signature sequence may be added at the head of UL granted resource to facilitate determining whether UL transmission happens. In this way, eNB can blindly search if there is such kind of signature sequence in the granted UL resource.

Alternatively, the signature sequence may be a reference signal embedded in the transmission and the position is known from the receiver. For example, the signature sequence may be a demodulation reference signal for decoding.

Returning back to FIG. 4(a), at step S430, if no data is transmitted from the first UE on the first link path, link adaptation for the grant resources for the first link path is inhibited. Accordingly, it is possible to avoid unnecessary link adaptation and thus improve spectrum efficiency.

If DL grant is provided to one UE, there is a probability that DL data transmission won't occur. Other solutions are proposed for improving spectrum efficiency under this circumstance, and will be explained in detail with reference to FIG. 4(d).

Figure 4D:
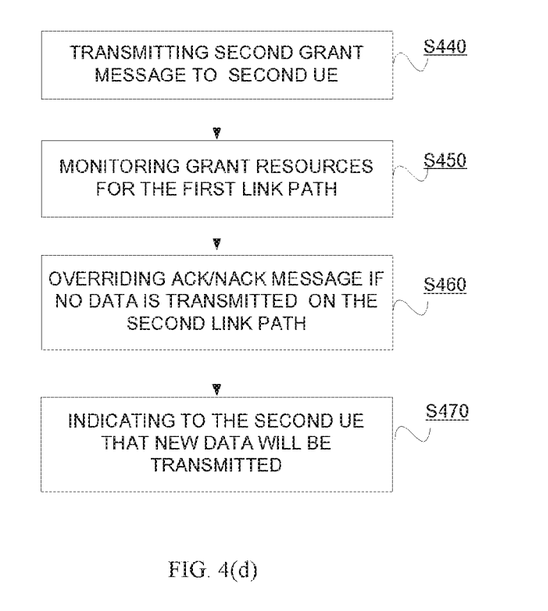
FIG. 4(d) is a flowchart illustrating additional steps for link adaptation according to an embodiment of the disclosure.

FIG. 4(d) is a flowchart illustrating additional steps for link adaptation according to an embodiment of the disclosure. At step S440, a second grant message allowing data transmission in the grant resources for the first link path is transmitted to a second UE, where the second grant message informs the second UE of a possibility of non-transmission at the grant for a second link path. For example, the first and second link paths may be uplink (UL) and downlink (DL) paths, respectively. The eNB may send, in UL grant resource for the first UE, an opportunistic DL grant message to the second UE. Herein, the "opportunistic DL grant message" refers to a new type of DL grant message indicating the possibility of non-transmission on the DL path.

At step S450, the grant resources for the first link path are monitored to determine whether data is transmitted to the second UE on the second link path. If no data is transmitted to the second UE on the second link path, an ACK/NACK message received from the second UE is overridden at step S460. At step S470, the second UE is notified that new data will be transmitted at the next possible grant for the second link path.

For example, the eNB may determine whether DL data can be sent to the second UE. The second UE monitors the resource and tries to decode the data. If DL data is decoded successfully, the second UE may send an ACK message back to the eNB. Otherwise, a NACK message may be sent to the eNB. The eNB may override this NACK message for link adaptation adjustment if it doesn't conduct the corresponding DL data transmission. In addition, the eNB may indicate "new data" to the second UE at the next possible DL transmission in order to avoid HARQ chase-combining kind of operation at the second UE.

Figure 5:
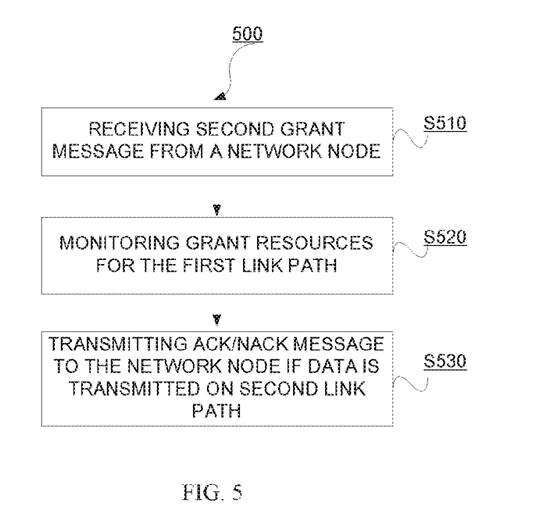
FIG. 5 is a flowchart illustrating a method in a wireless network for link adaptation according to another embodiment of the disclosure.

FIG. 5 is a flowchart illustrating a method 500 in a wireless network for link adaptation according to an embodiment of the disclosure. The method 500 may be performed at a user equipment in a wireless network, for example. The method 500 as shown in FIG. 5 includes the following steps.

At step S510, a second grant message allowing data transmission on a second link path in grant resources for a first link path is received from a network node. For example, the network node may be an eNB in a wireless network and the first and second link paths may be uplink (UL) and downlink (DL) paths, respectively.

At step S520, the grant resources for the first link path are monitored to determine whether data is transmitted on the second link path. If data is transmitted on the second link path in the grant resources for the first link path, an ACK/NACK message is transmitted to the network node, at step S530. If no data is transmitted on the second link path in the grant resources for the first link path, however, no ACK/NACK message will be sent to the network node.

For example, the second UE may detect whether DL data is transmitted or not by determining whether the signal strength within the PRBs specified at DL grant message is above a preset threshold or not, or whether its SINR above a preset threshold or not. Once it is determined that no DL data is transmitted to the second UE, the second UE will not transmit an ACK/NACK message to the eNB so as to avoid link adaption adjustment. Thus the spectrum efficiency can be improved.

Figure 6:
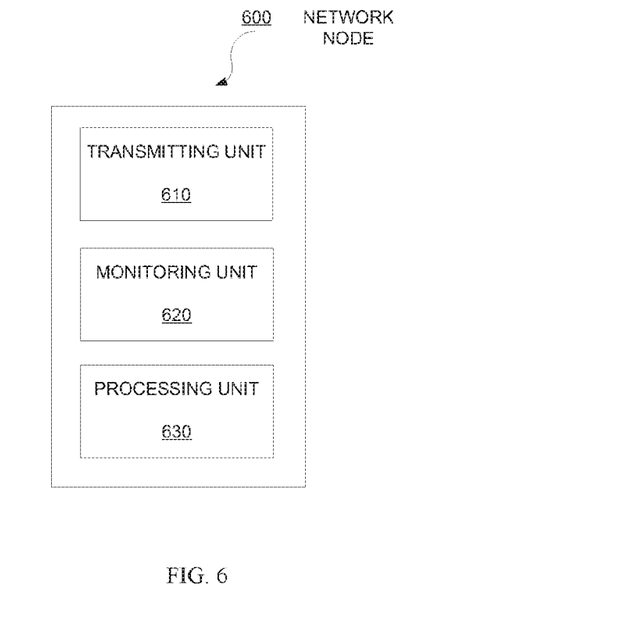
FIG. 6 is a block diagram of a network node which is implemented by means of hardware according to an embodiment of the disclosure.

FIG. 6 is a block diagram of a network node 600 which is implemented by means of hardware according to an embodiment of the disclosure. As shown in FIG. 6, the network node 600 comprises a transmitting unit 610, a monitoring unit 620, and a processing unit 630.

The transmitting unit 610 transmits a first grant message indicating grant resources for a first link path to a first UE. For example, the transmitting unit 610 may transmit an UL grant message indicating grant resources for a UL path to the first UE.

The monitoring unit 620 monitors the grant resources for the first link path to determine whether data is transmitted from the first UE on the first link path. For example, the monitoring unit 620 may aggregate received energy in the grant resources for the first link path, compare the aggregated energy with a threshold, and determine that data is transmitted from the first UE on the first link path if the aggregated energy is above the threshold. The threshold may be UE-specific, cell-specific, or fixed, etc.

Alternatively, the monitoring unit 620 may search a signature sequence in the grant resources for the first link path. If the signature sequence is found in the grant resources for the first link path, the monitoring unit 620 determines that data is transmitted from the first UE on the first link path.

The processing unit 630 may inhibit link adaptation for the grant resources for the first link path if no data is transmitted from the first UE on the first link path.

In addition, the transmitting unit 610 may transmit a second grant message allowing data transmission on a second link path in the grant resources for the first link path to a second UE, wherein the second grant message informs the second UE of a possibility of non-transmission at the grant for a second link path.

Under this circumstance, the monitoring unit 620 monitors the grant resources for the first link path to determine whether data is transmitted to the second UE on the second link path. The processing unit 630 may override an ACK/NACK message received from the second UE if no data is transmitted to the second UE on the second link path, and indicate to the second UE that new data will be transmitted at the next possible grant for the second link path.

With the network node 600 as shown in FIG. 6, unnecessary link adaptation can be avoided and spectrum efficiency is improved.

Figure 7:
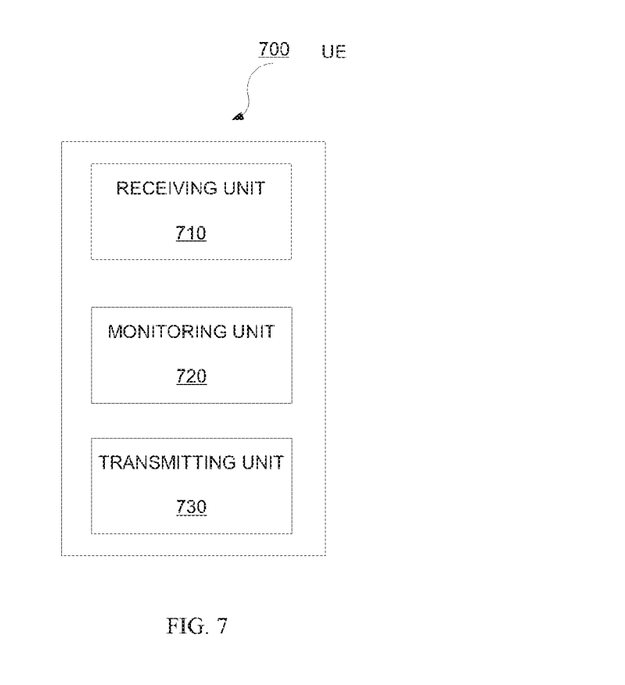
FIG. 7 is a block diagram of a user equipment which is implemented by means of hardware according to an embodiment of the disclosure.

FIG. 7 is a block diagram of a user equipment 700 which is implemented by means of hardware according to an embodiment of the disclosure. As shown in FIG. 7, the UE 700 comprises a receiving unit 710, a monitoring unit 720, and a transmitting unit 730.

The receiving unit 710 receives a second grant message allowing data transmission on a second link path in grant resources for a first link path from a network node. For example, the receiving unit 710 may receive an UL grant message indicating grant resources for a UL path from an eNB in a network.

The monitoring unit 720 monitors the grant resources for the first link path to determine whether data is transmitted on the second link path. For example, the monitoring unit 720 may determine whether the signal strength or signal-to-interference-plus-noise-ratio, SINR, within physical resource blocks, PRBs, specified at the grant for the second link path is above a threshold.

The transmitting unit 730 transmits an ACK/NACK message to the network node if data is transmitted on the second link path in the grant resources for the first link path. Otherwise, if no data is transmitted on the second link path in the grant resources for the first link path, the transmitting unit 730 does not transmit an ACK/NACK message to the network node.

As those skilled in the art will appreciate, the above-described units of the network node 600 and UE 700 may be implemented separately as suitable dedicated circuits. Nevertheless, these units can also be implemented using any number of dedicated circuits through functional combination or separation. In some embodiments, these units may be even combined in a single application specific integrated circuit (ASIC).

Figure 8A:
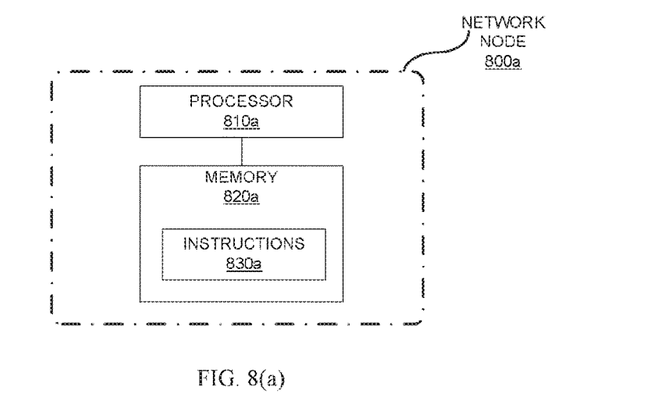
FIG. 8(a) is a block diagram of a network node which is implemented by means of hardware and software according to an embodiment of the disclosure.

FIG. 8(*a*) is a block diagram of a network node 800*a* which is implemented by means of hardware and software according to an embodiment of the disclosure. As an alternative software-based implementation, there is provided a network node 800*a* including a processor 810*a* and a memory 820*a* storing instructions executable by the processor 810*a*. The processor 810*a* may be implemented by a CPU (Central processing unit), and could also be implemented by other types of components. For example, the processor 810*a* may be implemented by general purpose microprocessors, instruction set processors and/or special purpose microprocessors such as Application Specific Integrated Circuit (ASICs). The processor 810*a*, when executing the instructions, controls the network node 800*a* to perform the above-described methods shown in FIGS. 4(*a*)-4(*d*).

Figure 8B:
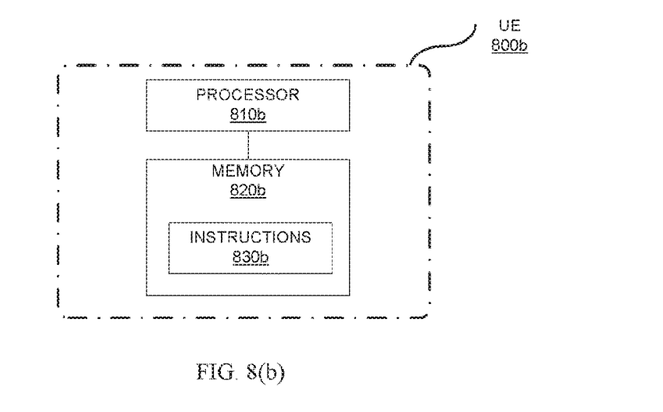
FIG. 8(b) is a block diagram of a user equipment which is implemented by means of hardware and software according to an embodiment of the disclosure.

FIG. 8(*b*) is a block diagram of a user equipment 800*b* which is implemented by means of hardware and software according to an embodiment of the disclosure. As an alternative software-based implementation, there is provided a user equipment 800*b* including a processor 810*b* and a memory 820*b* storing instructions executable by the processor 810*b*. The processor 810*b* may be implemented by a CPU (Central processing unit), and could also be implemented by other types of components. For example, the processor 810*b* may be implemented by general purpose microprocessors, instruction set processors and/or special purpose microprocessors such as Application Specific Integrated Circuit (ASICs). The processor 810*b*, when executing the instructions, controls the user equipment 800*b* to perform the above-described method shown in FIG. 5.

The embodiments of the disclosure can be implemented in computer program products. This arrangement of the disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules.

Figure 9:
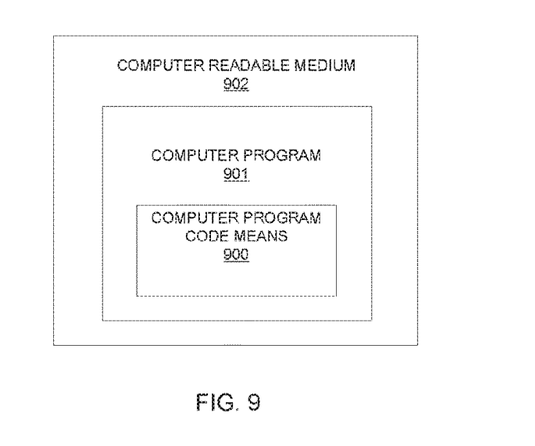
FIG. 9 is a block diagram of a computer readable medium having stored thereon a computer program comprising computer program code means according to an embodiment of the disclosure.

FIG. 9 is a block diagram of a computer readable medium having stored thereon a computer program comprising computer program code means according to an embodiment of the disclosure. As shown in FIG. 9, a computer readable medium 902 has stored thereon a computer program 901. The computer program 901 comprises computer program code means 900 for performing, when executed by at least one processor, the methods according to the disclosure as mentioned above. The computer readable medium 902 may have the form of a non-volatile or volatile memory, e.g., an Electrically Erasable Programmable Read-Only Memory (EEPROM), a flash memory, a floppy disk, and a hard drive, etc. The computer program code means 900 may include codes/computer readable instructions in any format.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The terms "first" and "second" refer to different elements. The singular forms "a" and "an" are intended to include the plural forms as well, unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In addition, language such as the phrase "at least one of X, Y and Z," unless specifically stated otherwise, is to be understood with the context as used in general to convey that an item, term, etc. may be either X, Y, or Z, or a combination thereof. Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The disclosure has been described with reference to embodiments and drawings. It should be understood that various modifications, alternations and additions can be made by those skilled in the art without departing from the spirits and scope of the disclosure. Therefore, the scope of the disclosure is not limited to the above particular embodiments but only defined by the claims as attached and equivalents thereof.

The invention claimed is:

1. A method in a wireless network for link adaptation, the method comprising:
    transmitting a first grant message indicating grant resources for a first link path to a first user equipment, UE;
    monitoring the grant resources for the first link path to determine whether data is transmitted from the first UE on the first link path; and
    inhibiting link adaptation for the grant resources for the first link path when no data is transmitted from the first UE on the first link path.

2. The method according to claim 1, wherein monitoring the grant resources for the first link path to determine whether data is transmitted from the first UE on the first link path comprises:
    aggregating received energy in the grant resources for the first link path;
    comparing the aggregated energy with a threshold; and
    determining that data is transmitted from the first UE on the first link path if the aggregated energy is above the threshold.

3. The method according to claim 2, wherein the threshold is UE-specific, cell-specific, or fixed.

4. The method according to claim 1, wherein monitoring the grant resources for the first link path to determine whether data is transmitted from the first UE on the first link path comprises:
    searching a signature sequence in the grant resources for the first link path; and
    determining that data is transmitted from the first UE on the first link path if the signature sequence is found in the grant resources for the first link path.

5. The method according to claim 1, further comprising:
    transmitting a second grant message allowing data transmission in the grant resources for the first link path to a second UE, wherein the second grant message informs the second UE of a possibility of non-transmission at the grant for a second link path;
    monitoring the grant resources for the first link path to determine whether data is transmitted to the second UE on the second link path;
    overriding an ACK/NACK message received from the second UE if no data is transmitted to the second UE on the second link path; and
    indicating to the second UE that new data will be transmitted at the next possible grant for the second link path.

6. A network node in a wireless network for link adaptation, the network node comprising:
    a transmitting unit configured to transmit a first grant message indicating grant resources for a first link path to a first user equipment, UE;
    a monitoring unit configured to monitor the grant resources for the first link path to determine whether data is transmitted from the first UE on the first link path; and
    a processing unit configured to inhibit link adaptation for the grant resources for the first link path when no data is transmitted from the first UE on the first link path.

7. The network node according to claim 6, wherein the monitoring unit is configured to:
    aggregate received energy in the grant resources for the first link path;
    compare the aggregated energy with a threshold; and
    determine that data is transmitted from the first UE on the first link path if the aggregated energy is above the threshold.

8. The network node according to claim 7, wherein the threshold is UE-specific, cell-specific, or fixed.

9. The network node according to claim 6, wherein the monitoring unit is configured to:
    search a signature sequence in the grant resources for the first link path; and
    determine that data is transmitted from the first UE on the first link path if the signature sequence is found in the grant resources for the first link path.

10. The network node according to claim 6, wherein
    the transmitting unit is further configured to transmit a second grant message allowing data transmission on a second link path in the grant resources for the first link path to a second UE, wherein the second grant message informs the second UE of a possibility of non-transmission at the grant for a second link path;
    the monitoring unit is further configured to monitor the grant resources for the first link path to determine whether data is transmitted to the second UE on the second link path; and
    the processing unit is further configured to override an ACK/NACK message received from the second UE if no data is transmitted to the second UE on the second link path, and indicate to the second UE that new data will be transmitted at the next possible grant for the second link path.

* * * * *